United States Patent [19]

Carriere

[11] 4,449,423

[45] May 22, 1984

[54] TRACTION DRIVE AUTOMATIC TRANSMISSION FOR GAS TURBINE ENGINE DRIVELINE

[75] Inventor: Donald L. Carriere, Livonia, Mich.

[73] Assignee: Ford Motor Company, Dearborn, Mich.

[21] Appl. No.: 396,550

[22] Filed: Jul. 9, 1982

[51] Int. Cl.³ .................... F16H 47/08; F16H 37/06
[52] U.S. Cl. ...................................... 74/688; 74/691; 74/705; 74/730
[58] Field of Search ................ 74/679, 681, 690, 695, 74/705, 721, 730, 688, 687, 691

[56] References Cited

U.S. PATENT DOCUMENTS

| | | | |
|---|---|---|---|
| 2,181,380 | 11/1939 | Pollard | 74/691 |
| 2,446,462 | 8/1948 | Dodge | 74/689 |
| 3,078,736 | 2/1963 | Meads et al. | 74/688 X |
| 3,688,600 | 9/1972 | Leonard | 74/690 |
| 3,866,490 | 2/1975 | Orshansky, Jr. | 74/687 |
| 3,915,033 | 10/1975 | Polak | 74/758 X |
| 4,342,238 | 8/1982 | Gardner | 74/705 X |
| 4,344,336 | 8/1982 | Carriere | 74/690 |
| 4,346,622 | 8/1982 | Pierce | 74/688 |
| 4,368,649 | 1/1983 | Vahratian et al. | 74/695 |
| 4,418,585 | 12/1983 | Pierce | 74/695 |

Primary Examiner—Lawrence J. Staab
Assistant Examiner—Dwight G. Diehl
Attorney, Agent, or Firm—Frank G. McKenzie; Donald J. Harrington

[57] ABSTRACT

A transaxle driveline for a wheeled vehicle has a high speed turbine engine and a torque splitting gearset that includes a traction drive unit and a torque converter on a common axis transversely arranged with respect to the longitudinal centerline of the vehicle. The drive wheels of the vehicle are mounted on a shaft parallel to the turbine shaft and carry a final drive gearset for driving the axle shafts. A second embodiment of the final drive gearing produces an overdrive ratio between the output of the first gearset and the axle shafts. A continuously variable range of speed ratios is produced by varying the position of the drive rollers of the traction unit. After starting the vehicle from rest, the transmission is set for operation in the high speed range by engaging a first lockup clutch that joins the torque converter impeller to the turbine for operation as a hydraulic coupling.

5 Claims, 2 Drawing Figures

TRACTION DRIVE AUTOMATIC TRANSMISSION FOR GAS TURBINE ENGINE DRIVELINE

BACKGROUND OF THE INVENTION

1. Field of the Invention

This invention relates to a continuously variable speed ratio transmission. More particularly, the invention pertains to such a transmission wherein a differential speed ratio traction drive unit produces the continuously variable speed ratios in combination with a hydraulic torque converter located behind the traction unit in a driveline that includes a torque splitting gearset.

2. Description of the Prior Art

A continuously variable transmission can produce a wide range of speed and torque ratios through an infinite number of steps. It is known in the prior art that the range of ratios can be varied by a traction drive unit which produces the ratio variations depending upon the radius at which a friction drive element contacts the driving and driven disks of the traction unit. U.S. Pat. Nos. 2,181,380 and 2,446,462 disclose power transmissions employing traction drive units. Traction drive units of this type transmit torque from the driving element to the driven element by developing friction forces on the surface of an intermediate element at the points of contact with the driving and driven members.

Traction drives are subject to excessive wear on the drive surfaces because power is transmitted by friction, yet frequent service and replacement of the drive elements is unacceptable in an automotive transmission. Furthermore, power losses particularly those resulting from slippage at the mating friction surfaces are a recognized problem that can produce unaccepatable pulsing when the surfaces lose and regain driving engagement.

SUMMARY OF THE INVENTION

Excessive wear on the driving surface of the traction drive mechanism is avoided in the transmission according to my invention by providing, in the lower speed range, multiple torque delivery paths, one of which includes drive through the traction unit. A first power splitting gearset transmits a portion of the engine torque directly to the output gearing and second portion of the torque to a traction drive unit arranged to produce torque multiplication and speed reduction. A torque converter located in the driveline behind the traction unit has its impeller driven from the traction unit and its turbine driven from the impeller. The portion of the engine power that is transmitted through the traction drive unit decreases as vehicle speed increases. When the speed ratio of the torque converter reaches approximately 0.85, a lockup clutch is engaged after which the turbine and impeller turn at the same speed.

In the high speed ratio range the drive rollers of the traction unit vary in position so as to drive the output member in a range of speed that varies from one-third to three times the speed of the input member. In this way a continuously variable range of axle shaft speed is produced in a final drive gearset that produces direct and reverse drive. A second form of the final drive gearing includes provision for an overdrive ratio between the speed of the output shaft of the first gearset and that of the axle shafts.

DESCRIPTION OF THE PREFERRED EMBODIMENT

Figure 1:
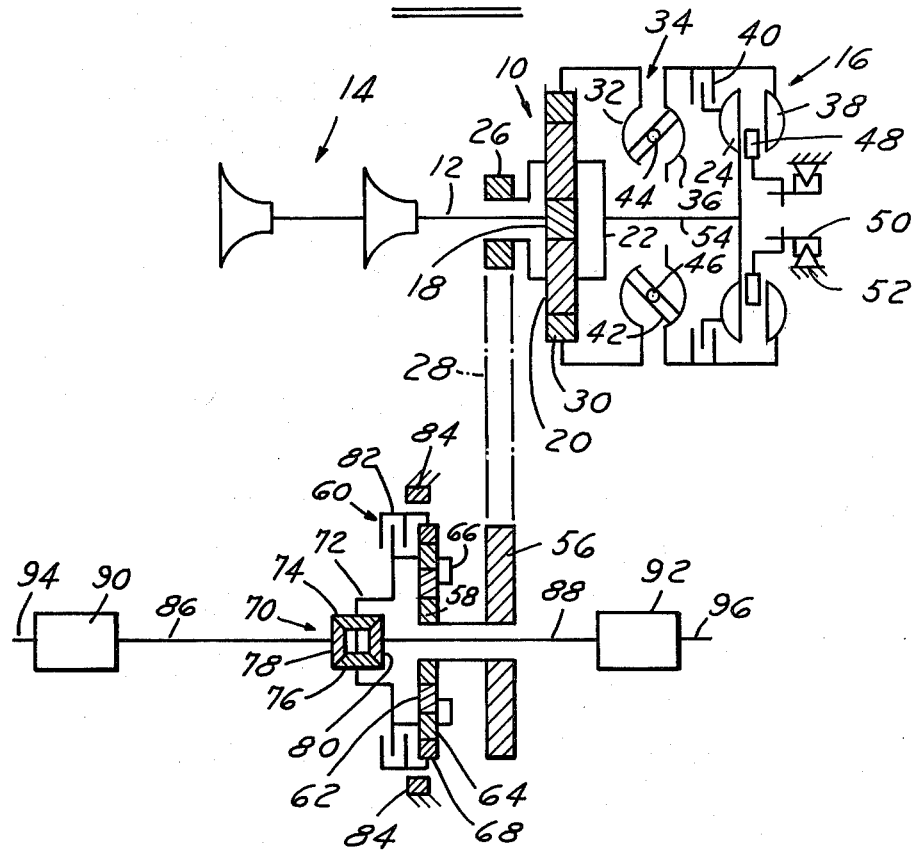
FIG. 1 is a schematic diagram showing the relative positions of the components of the driveline, the gearing, shafting, clutches and brakes that couple and hold the gear elements.

Referring first to FIG. 1, a first epicyclic gearset 10 is located in the driveline between the output shaft 12 of a gas turbine engine 14 and an angularly variable stator torque converter 16. The first gearset includes a first sun gear 18 that is fixed to the output shaft and meshes with a first set of planetary pinions 20. The planet pinions are rotatably supported on a first carrier 22 that is drivably connected to the turbine 24 of the torque converter at one end and at the opposite end carries a sprocket 26, which drives an endless flexible belt or chain 28. A first ring gear 30 is continuously engaged with the first planet pinion set and is connected to the first disk member 32 of the traction drive unit 34.

The traction drive unit includes first and second toroidal disk members 32,36, the second of these being connected directly to the impeller 38 of the torque converter and selectively connectable to the turbine 24 by engagement of clutch 40. The traction drive unit includes rollers 42 that are journalled for rotation about axes 44, 46. The disposition of the rollers about the axes can be continuously varied by a suitable control mechanism so that the driving ratio between disks 32 and 36 can be varied. The direction of rotation of one disk is opposite the direction of the other.

The torque converter includes a stator or reaction member 48 mounted on an overrunning clutch 50 whose opposite end is fixed to the transmission casing at 52. The converter 16 functions as a torque converter at low engine speeds by hydrodynamically driving the turbine from the impeller. The stator in the usual way changes the direction of the hydraulic fluid within the converter between the turbine outlet and the impeller inlet so that the kinetic energy left in the fluid will drive the impeller. The stator reacts the torque applied to the turbine that exceeds the torque on the impeller so that torque multiplication occurs within the converter. The stator is subjected to a torque opposite in direction to that of the turbine. At a predetermined speed ratio known as the coupling point, the output torque drops to the value of the input torque so that the torque ratio is 1:1. At that point of torque equality, the reaction on the stator vanishes and at high output speeds when the output torque is smaller than the input torque, the fluid presses against the back of the reaction member and tends to turn it in the direction that the impeller and turbine are revolving. With the reactor mounted on the overrunning clutch and the torque ratio at 1:1, there is no torque on the reaction member. Thereafter, as turbine speed increases, the reaction member beings to freewheel. It offers virtually no resistance to fluid flow and the fluid enters the impeller at nearly the same vortex velocity from which it leaves the turbine, a characteristic of coupling action. Turbine 24 is connected by shaft 54 to the first carrier 22.

The flexible drive element 28 engages a second sprocket 56 which is connected to the sun gear 58 of a second planetary gear set 60. A second set of planetary pinions 62, 64 are supported for rotation about different axes on a second carrier 66. The planet pinion set 62 engages sun gear 58 and is continuously engaged with the planet pinion set 64, which is continuously engaged with a second ring gear 68.

A standard or limited slip differential 70 has a spindle 72 that rotatably carries the bevel pinions 74, 76 which are engaged with side bevel gears 78, 80. Spindle 72 is continuously connected to carrier 66 and selectively connected to ring gear 68 through engagement of friction clutch 82. A hydraulically actuated servo controls the operation of a friction brake 84, which holds ring gear 68 against rotation by joining it to the transmission casing or another fixed point when the brake is actuated.

Extending transversely outward from the differential mechanism 70 are halfshafts 86, 88 on which are attached constant velocity universal joints 90, 92 through which the associated axle shafts 94, 96 are driven.

For operation in the low speed range, the drive rollers of the traction drive unit are positioned to drive the second disk member 36 at one-third the speed of the first member 32. Lockup clutch 40 is disengaged and clutch 82 of the final drive gear set is engaged. The torque converter turbine 24 is driven from the impeller through the traction unit 34 and ring gear 30. The first gearset 10 splits power between a direct output path and the torque path that includes the variable ratio traction unit and the torque converter. Each of these paths drives the first carrier 22 on which the sprocket is mounted and through which the output sprocket 56 is driven by the chain 28. In the final driving gearing 60, ring gear 68 is fixed to the second carrier 66 by the engagement of clutch 82 and the carrier turns spindle 72 of the differential mechanism, which transmits torque to the drivewheels of the vehicle by way of axle shafts 94, 96.

Reverse drive results when final drive clutch 82 is disengaged and brakeband 84 is applied. This action fixes ring gear 68 to the transmission housing and the differential mechanism is driven from carier 66.

The transition from the low speed range to the high speed range begins when the vehicle speed approaches 12 mph and lockup clutch 40 is pressurized. This engagement, which is completed at approximately 15 mph, fixes the turbine to the impeller causing the torque converter to function as a hydraulic coupling. In the high speed range the rollers of the traction drive unit are varied in position so as to drive the second disk member 36 at a speed that varies within the range between one-third and three times the speed of the first toroidal disk member 32. Since the impeller and turbine of the torque converter are locked up, shaft 54 has the same speed as the second disk member 36. The first gearset 10, which splits power between the torsion path that includes the torque converter and the direct torque path, combines the output torques from these paths in the first carrier 22 which drives the second sprocket 56 from the drive chain 28. Clutch 82 of the final drive gearset is engaged to connect second carrier 66 to ring gear 68 and the differential mechanism spindle 72 is driven from the carrier 66 as in the low speed range.

Figure 2:
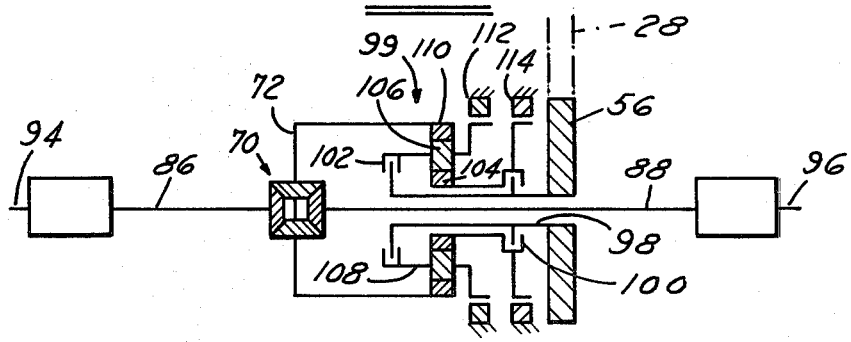
FIG. 2 is a schematic diagram of a alternate final drive gearset adapted to produce an overdrive speed ratio.

In FIG. 2 an alternate form for the final drive gearing that produces direct drive, overdrive and reverse is shown. Output sprocket 56 is mounted on a sleeve shaft 98, which carries friction disks of the clutches 100 and 102. The gearset includes sun gear 104, a set of planetary pinions 106 rotatably mounted on a carrier 108 and a ring gear 110 connected to the spindle 72 of the differential mechanism. The planet pinions are continuously engaged with the sun gear and the ring gear. Carrier 108 provides a drum surface that is engaged selectively by brakeband 112 for connection to the transmission casing. A second brakeband 114 selectively couples the other element of clutch 100 to the transmission casing.

In the low speed ratio range, lockup clutch 40 is disengaged, the rollers of the traction drive unit are positioned to drive the second disk member at one-third the speed of the first disk member, and clutches 100 and 102 are engaged. Engagement of clutches 100 and 102 locks planet carrier 108 to sun gear 104 which is driven by the input shaft 98. Output to the differential mechanism is by way of ring gear 110. In the high speed range, as in the embodiment described with respect to FIG. 1, a continuously variable output speed is produced by varying the position of the drive rollers of the traction unit so as to drive the second disk in the range between one-third and three times the speed of the first disk member. Overdrive is produced by holding the sun gear against rotation by applying brakeband 114 and driving the pinion carried through engagement of clutch 102. The planet pinions are forced to walk around the stationary sun gear and drive the ring gear at a faster speed than the input shaft.

Reverse drive is produced by holding the planet pinion carrier 108 stationary by fixing it to the transmission casing upon applying brake band 112 and driving sun gear 104 from the sprocket 56 by engaging clutch 100. The output is taken from the ring gear which transmits torque to the differential mechanism 70.

Having described a preferred form of my invention, what I claim and desire to secure by U.S. Letters Patent is:

1. A power transmission for an automotive vehicle comprising:
    an input shaft;
    a first planetary gearset having a first sun gear connected to the input shaft, a first ring gear, a first set of planet pinions engaging the first sun gear and the first ring gear, and a first carrier on which the planet pinion set is rotably mounted;
    a traction drive unit having a first member connected to the first ring gear, a second member, and drive rollers engaging the first and second members for transmitting power therebetween, the unit being adapted to produce a continuously variable range of ratios of the speed of the second member to the speed of the first member;
    a torque converter having an impeller connected to the second member of the traction drive unit, a turbine in hydrodynamic drive relationship with the impeller connected to the first carrier and selectively connectable to the second member of the traction drive unit, and a stator mounted on a clutch that provides a one-way driving connection between the stator and the transmission casing; and
    a first clutch for selectively connecting the torque converter turbine to the second member of the traction drive unit and to the impeller of the torque converter.

2. The transmission of claim 1 wherein the traction drive unit includes first and second toroidal disk members mounted for rotation about an axis and disposed adjacent one another to define a pair of facing friction surfaces therebetween, the drive roller drivably engaging the friction surfaces of the first and second members and means for adjusting the axes of rotation of the drive rollers whereby the relative speed of the first and second members is varied.

3. The transmission of claim 2, wherein the speed of the first and second members is varied by adjusting the radial distance from the axis of the first member to the position on its friction surface at which a drive roller is engaged in relation to the radial distance from the axis of the second member to the position on its friction surface at which a drive roller is engaged.

4. The transmission of claim 1 further comprising:
a second planetary gearset including a second sun gear drivably connected to the first carrier, a second ring gear selectively connectable to the transmission casing, a second carrier, second and third intermeshing planetary pinion sets rotatably mounted on the second carrier, the second pinion set engaging the second sun gear, the third pinion set engaging the second ring gear;
a second clutch for selectively connecting the second ring gear to the second carrier;
brake means for selectively holding the second ring gear against rotation; and
a differential mechanism connected at one end to the second carrier and to the second ring gear through the second clutch and connected at its opposite end to the drive wheels of the vehicle.

5. The transmission of claim 1 further comprising:
a second planetary gearset including a second sun gear, a second carrier, a second planet pinion set engaged with the second sun gear and a second ring gear rotatably mounted on the second carrier;
a second clutch for selectively connecting the second carrier to the first carrier;
a third clutch for selectively connecting the first carrier to the second sun gear;
a first brake for selectively holding the second carrier against rotation;
a second brake for selectively holding the second sun gear against rotation; and
a differential mechanism connected at one end to the second ring gear and connected at its opposite end to the drive wheels of the vehicle.

* * * * *